1515151515151515151515 US005577649A

United States Patent [19]

Lee, Jr. et al.

[11] Patent Number: 5,577,649
[45] Date of Patent: Nov. 26, 1996

[54] HINGED RAIL ARTICLE CARRIER

[75] Inventors: James A. Lee, Jr., Warren; Douglas L. Wickham, Troy; Gregory L. Eilers, Royal Oak; William D. Batterson, Grand Blanc; Craig A. Stapleton, Rochester Hills, all of Mich.

[73] Assignee: Advanced Accessory Systems L.L.C., Sterling Heights, Mich.

[21] Appl. No.: 299,208

[22] Filed: Aug. 31, 1994

Related U.S. Application Data

[63] Continuation-in-part of Ser. No. 124,984, Sep. 21, 1993, Pat. No. 5,411,196.

[51] Int. Cl.⁶ ..................................................... B60R 9/04
[52] U.S. Cl. ........................ 224/321; 224/325; 224/326; 224/315
[58] Field of Search .................................. 224/321, 323, 224/324, 325, 326, 917, 309, 310, 315, 317

[56] References Cited

U.S. PATENT DOCUMENTS

| Re. 26,539 | 3/1969  | Bott .           |
|------------|---------|------------------|
| Re. 32,583 | 1/1988  | Bott .           |
| 2,833,453  | 5/1958  | Barreca .        |
| 3,223,302  | 12/1965 | Helm .           |
| 3,239,115  | 3/1966  | Bott et al. .    |
| 3,241,501  | 3/1966  | Watts .          |
| 3,325,067  | 6/1967  | Helm .           |
| 3,610,491  | 10/1971 | Bott .           |
| 3,848,785  | 11/1974 | Bott .           |
| 4,099,658  | 7/1978  | Bott .           |
| 4,133,465  | 1/1979  | Bott .           |
| 4,182,471  | 1/1980  | Bott .           |
| 4,239,139  | 12/1980 | Bott .           |
| 4,295,587  | 10/1981 | Bott .           |
| 4,295,588  | 10/1981 | Kowalski et al. .|
| 4,364,500  | 12/1982 | Bott .           |
| 4,427,141  | 1/1984  | Bott .           |
| 4,431,123  | 2/1984  | Bott .           |
| 4,440,333  | 4/1984  | Bott .           |
| 4,497,425  | 2/1985  | Mobius .         |
| 4,516,709  | 5/1985  | Bott .           |
| 4,516,710  | 5/1985  | Bott .           |
| 4,728,019  | 3/1988  | Olliges .        |
| 4,930,671  | 6/1990  | Tittel .         |
| 5,139,375  | 8/1992  | Franchuk .       |
| 5,411,196  | 5/1995  | Lee, Jr. et al. ............. 224/321 |

FOREIGN PATENT DOCUMENTS

| 246658    | 3/1963  | Australia .      |
| 2376013   | 7/1978  | France .         |
| 2699475   | 6/1994  | France .         |
| 2353006   | 4/1975  | Germany .        |
| 3514129   | 10/1986 | Germany .        |
| 3805930A1 | 9/1989  | Germany .        |
| 2054495   | 2/1981  | United Kingdom . |

*Primary Examiner*—Henry J. Recla
*Assistant Examiner*—Charles R. Eloshway
*Attorney, Agent, or Firm*—Rader, Fishman & Grauer PLLC

[57] ABSTRACT

An article carrier includes spaced longitudinal rails, at least one of the rails having an upper arm coupled by a hinge to a lower arm. A crossbar having an end portion adapted to be entrained between the upper and lower arm portions includes a conformingly shaped mating surface to one of the members of the longitudinal rail. Preferably, both ends of each crossbar include conforming surfaces that mate with corresponding configurations on the rail to fixedly position the crossbar along the longitudinal rail. The position of the crossbar is easily adjusted by opening the upper member of the longitudinal rail by displacement about the hinge, and the hinge axis may be transversely, longitudinally or vertically aligned as desired. Preferably, two upper arms are provided on a longitudinal rail, hinged at opposite ends of the longitudinal rails, and include overlapping portions retained by a single latch mechanism. In addition, the crossbar preferably includes a retainer that engages a lip in the lower arm of the rail so that the lower arm resists lifting of the crossbar from the rail.

16 Claims, 8 Drawing Sheets

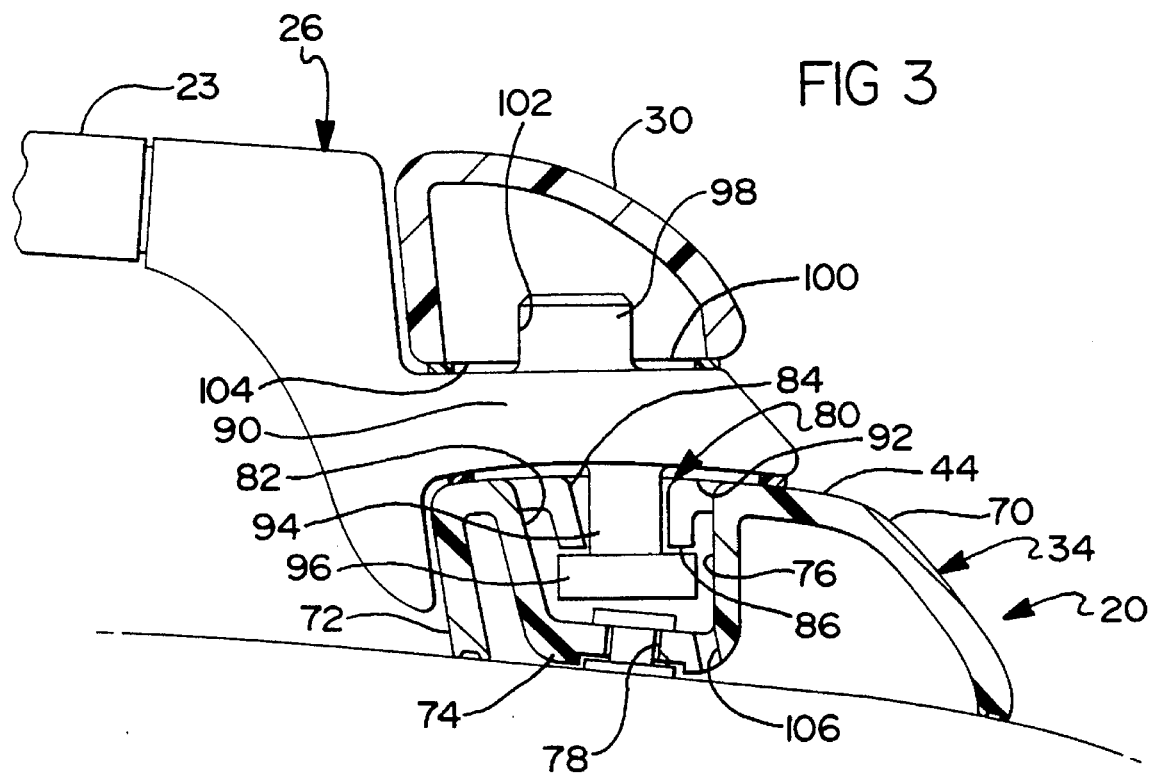
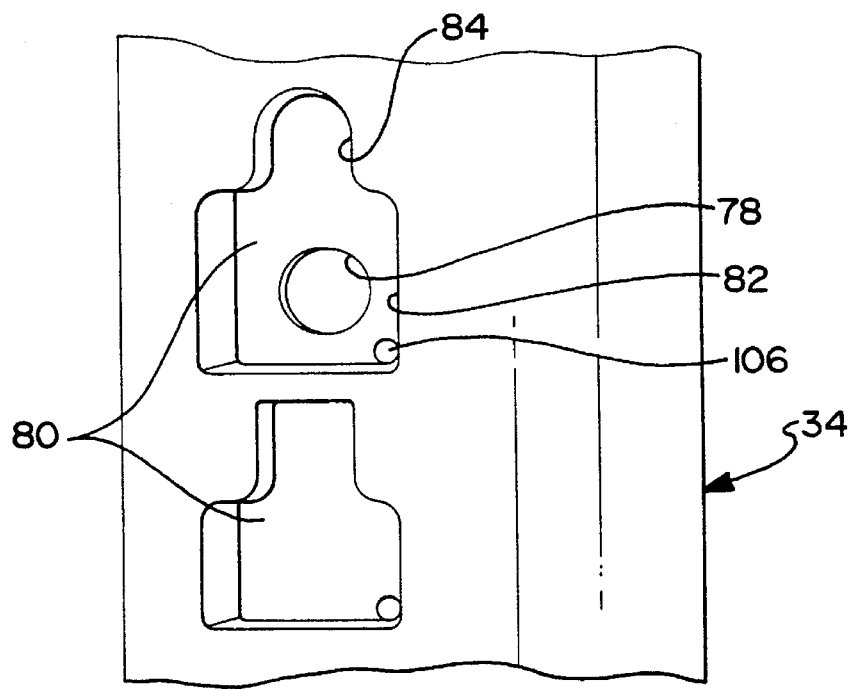

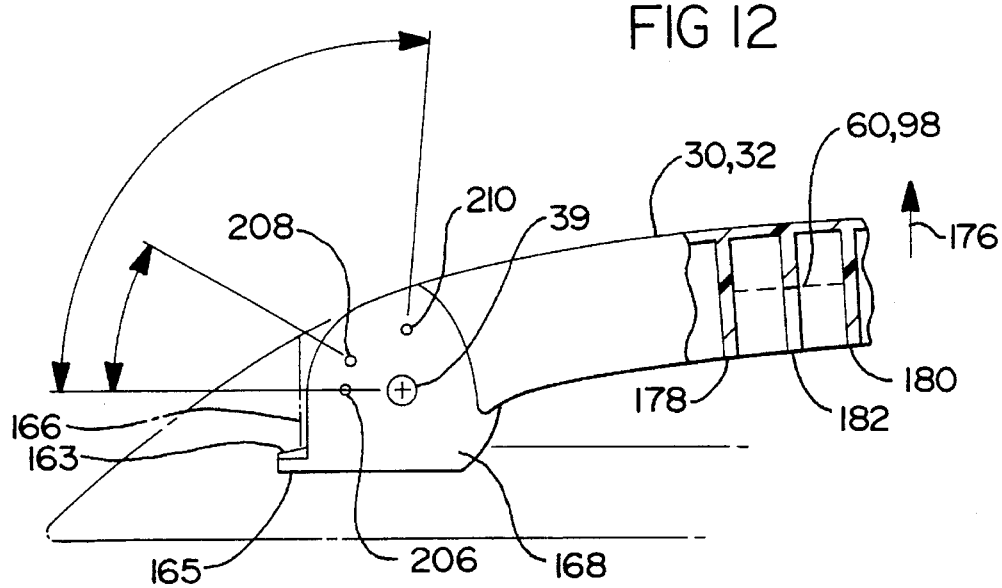
FIG 12
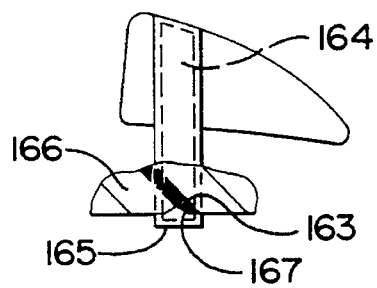
FIG 13
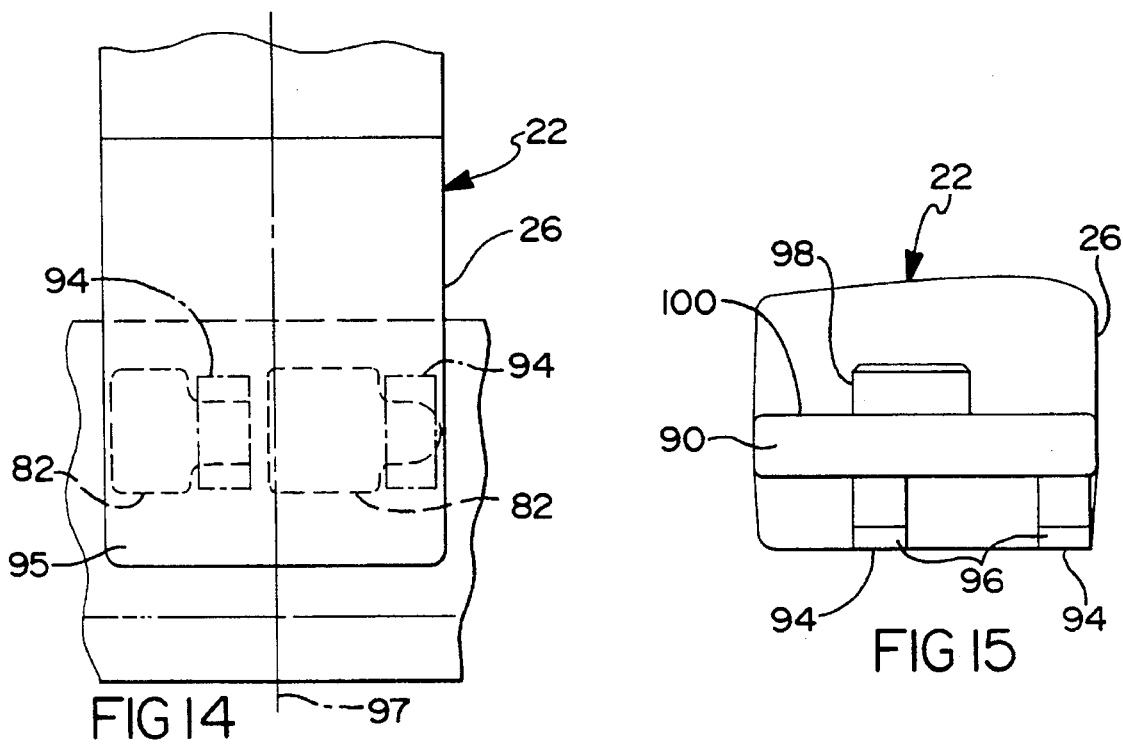
FIG 14
FIG 15

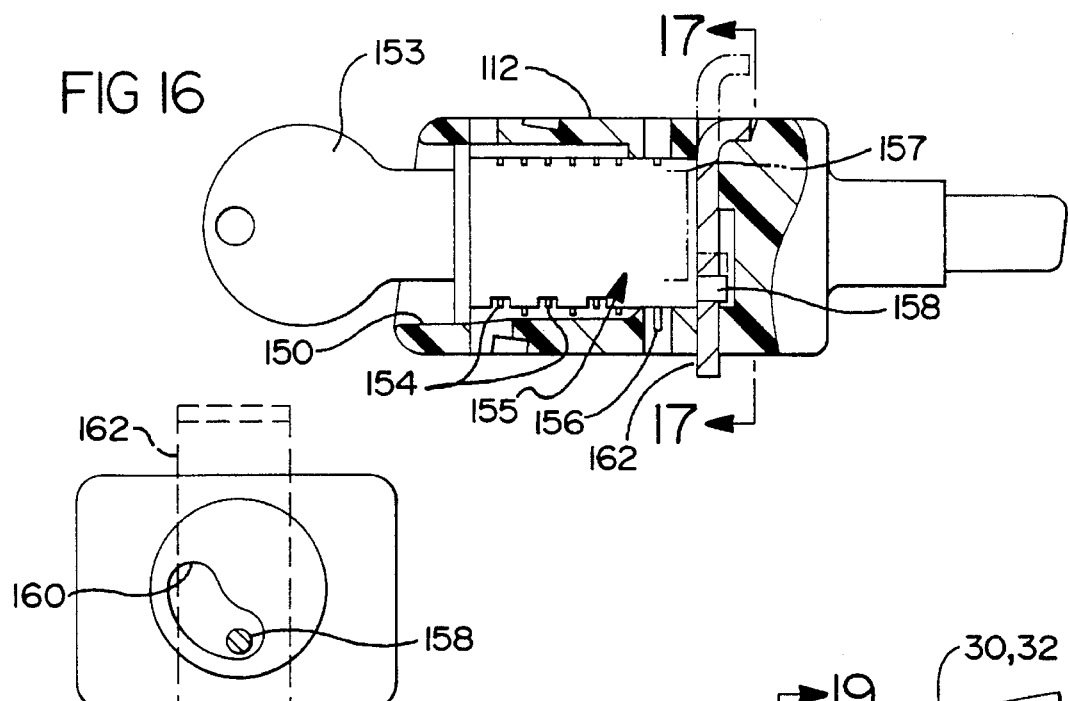
FIG 16
FIG 17
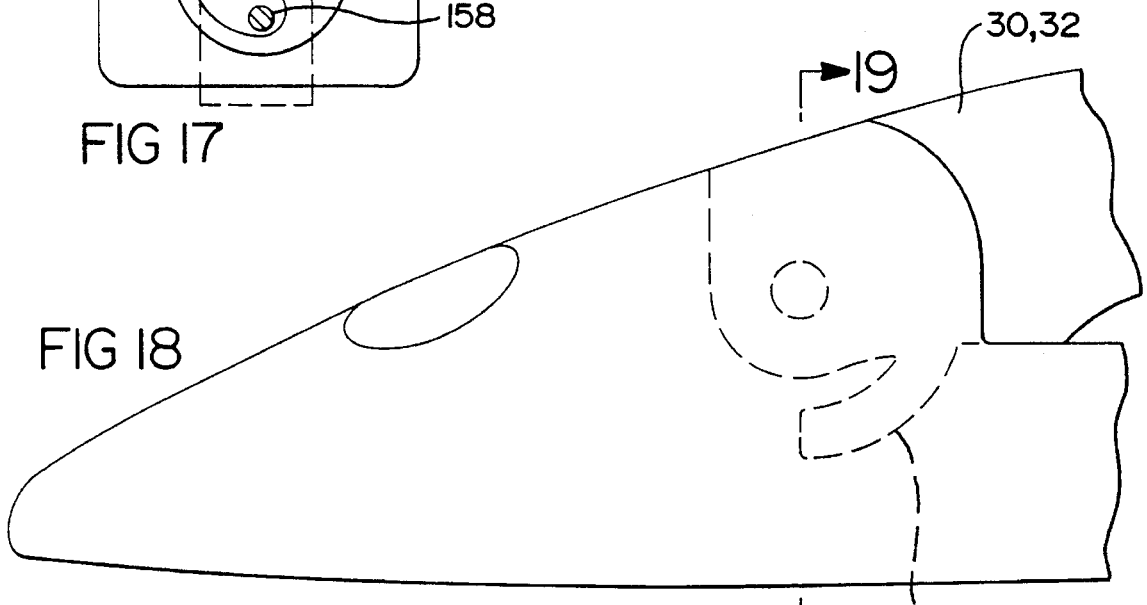
FIG 18
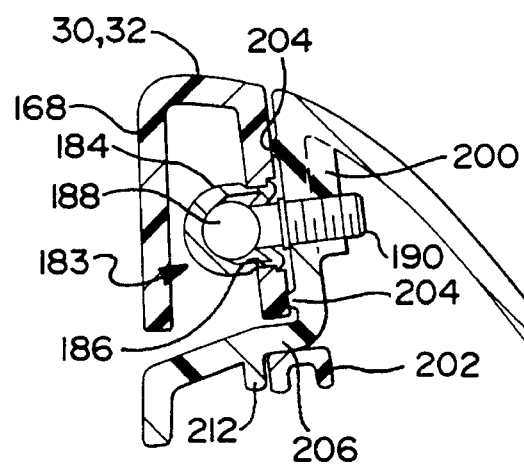
FIG 19

HINGED RAIL ARTICLE CARRIER

The present application is a continuation-in-part of application Ser. No. 08/124,984, filed Sep. 21, 1993, now U.S. Pat. No. 5,411,196.

FIELD OF THE INVENTION

The present invention relates generally to article carriers mounting on motor vehicle body panels, and more particularly to article carriers having releasably locking crossbars extending between the rails.

BACKGROUND ART

Motor vehicle article carriers have long been known to be useful for increasing the cargo capacity of motor vehicles. Generally, the carriers comprise rigid bars which are mounted to and supported above a vehicle body panel to provide a solid support that does not deform the finished body panel, and avoids abrasive contact between the cargo and the vehicle body panel. However, many of the previously known article carriers were rigid structures which could not be adjusted to fit differently sized articles or parcels, and the parcels had to be strapped or otherwise tied to the article carrier in order to maintain the articles in position as the vehicles objected to movement of the vehicle and environmental conditions.

One previously known improvement for retaining articles in a fixed position on the article carrier was to provide crossbars extending between longitudinal rails, the crossbars being constructed as clamps to grip and hold articles in a fixed position on the carrier. In particular, some previously known carriers particularly adapted for carrying skis include upper arms pivotally connected to lower arms of the crossbars so that they can be pivoted up to receive a set of skis between padded layers on the upper and lower arms. The upper arms pivoted downwardly into pressing engagement with the ski and the lower arm member and a locking means clamps the upper arm in its compression position. However, such article carriers are particularly adapted for long relatively narrow structures, and are ill suited for a wide variety of cargo shapes and sizes.

Another previously known improvement in article carrying devices includes crossbars which were slidably received in elongated channels of longitudinal rail members. Typically, the crossbars include a clamping means such as cams or other locking members in order to retain the crossbar in a fixed position within the channel of the rail as desired. However, the open channels and the clamping members, including the particularly shaped surfaces or complex clamping elements, are exposed to environmental conditions and subject to the deforming, obstructive or corrosive effects of temperature, humidity, wind and debris. For example, ice accumulation could impede installation or movement of the crossbar within the channel.

In addition, specifications and standards for vehicle mounted luggage carriers are often established before a particular design or style of luggage carrier may be accepted for production. For example, the cross bars may be required to withstand particular force and torques when locked in position in the side rails and withstand deformation as loads carried by the carrier may shift in response to vehicle motion and deceleration. However, the resistance to removal or displacement of the crossbars is in large part a function of the particular connection used to retain the crossbar in position on the rail. For example, where a member clamps over a crossbar portion to retain it in a fixed position along the rail, that member and its retainers bear the entire force of maintaining the crossbar under the member. Accordingly, the forces are not distributed throughout the entire carrier structure in a manner which could reduce the thickness or strength of the retaining member and its associated mounting hardware.

SUMMARY OF THE INVENTION

The present invention overcomes the above-mentioned disadvantages by providing an article carrier in which displaceable crossbars have end portions received within and between upper and lower arms of spaced longitudinal rails. In addition, both the upper and lower arms of the rail serve to retain the crossbar against removal from its position on the lower rail. A hinge couples the upper arm to the lower arm of at least one rail.

As used in the disclosure, the term rail is also to be understood as including a rail set in which the upper arm and lower arm are separately supported on a vehicle roof so long as a hinge or pivotal connection between the upper arm and the roof or support surface permits closure of the upper arm to its spaced, closed position over the lower arm. The present invention preferably includes complementary surfaces on the ends of the crossbar and a mating surface on an arm of the longitudinal rail to define stabilized support positions for a crossbar along the longitudinal rail. In addition, the lower arm of the rail may include an interlock with a member overlapping a portion of the crossbar to resist vertical displacement of the crossbar from the lower arm of the rail.

In a preferred embodiment, a longitudinal rail includes two upper arms, each arm being hinged at an opposite end of the rail to pivot about a traverse axis in an arc within a plane above the lower rail arm. The other end of each upper arm includes a latching end, preferably with overlapping arm portions at the center of the rail, whereby a single latch mechanism engaging one of the upper arms clamps both of the upper arms in their closed position. In one preferred embodiment, the complementary surface configurations include transverse corrugations in a surface of the lower rail and the lower mating surface of the end of the crossbar. The latching mechanism may include a lock, or a separate locking mechanism may be employed to restrict unlatching of the upper member and removal of the crossbar.

In another preferred embodiment of the invention, vertical protrusions and valleys, for example, sinuous corrugations, are provided on the mating surfaces of the rail arm and the end of the crossbar. Moreover, while one embodiment uses hinged upper arms on both longitudinal rails, an alternative embodiment employs the advantages of the present invention in an article carrier in which the hinged upper arm is carried by only one of the two longitudinal rails. Moreover, as is also disclosed in the present application, the hinge extending between the upper and lower member of the rail may have a hinge axis aligned longitudinally, vertically or transversely without departing from the present invention.

A preferred embodiment of a crossbar, or a stanchion for a crossbar, includes an end portion which may be received under a lip of the lower arm of the rail so that the lower rail contributes to resistance against vertical separation of the end piece and associated member from the lower arm of the rail. Accordingly, the article carrier is better able to satisfy load test specifications and performance standards with components made of substantially lighter and simpler components. Both the upper arm and lower arm of the rail contribute to retention of the crossbar and prevent its separation from the lower arm. Similarly, lighter gauge materials may be worked with substantially simpler or longer-lasting tooling, and may be made less expensively, than previously known constructions built to exceed the test specifications and performance standards that must be met by such components for production vehicle article carriers.

As a result, the present invention provides an article carrier with secure attachment of movable crossbars to longitudinal rails by clamping the crossbar ends between upper and lower members of the longitudinal rails. Moreover, the rails and the ends of the crossbar include mating surfaces with corresponding configurations that serve to secure the crossbar in a fixed position when engaged between the upper and lower members of the rail. Nevertheless, a hinged upper member of at least one rail is easily displaced from a particular spaced position over the lower member, to release the crossbar for free movement along the longitudinal rail. Moreover, the present invention provides an article carrier in which the ends of the crossbar, as well as the supporting surfaces of the rails, are covered and protected by upper arms and the upper arms may be selectively displaced from engagement with the lower arm of the rail and the crossbars. Moreover, multiple arms can be used on each rail or on more than one rail to increase the adjustability of the crossbar positions along the longitudinal rails and to increase the utility of the article carrier.

BRIEF DESCRIPTION OF THE DRAWING

The present invention will be more clearly understood by reference to the following detailed description when read in conjunction with the accompanying drawing in which like reference characters refer to like parts throughout the views and in which:

FIG. 3 is an enlarged, sectional view taken substantially along line 3—3 in FIG. 1;

FIG. 4 is an enlarged plan view taken in the direction of arrow 4 in FIG. 2;

FIG. 12 is an enlarged sectional view taken substantially along the line 12—12 in FIG. 1;

FIG. 13 is an enlarged sectional view taken substantially along the line 13—13 in FIG. 1;

FIG. 14 is an enlarged plan view of a portion of crossbar connection to the rail shown in FIG. 1;

FIG. 15 is a side view of the crossbar shown in FIG. 14;

FIG. 16 is a plan view of a lock cylinder incorporated in the button housing of FIGS. 7–9 but with parts removed for the sake of clarity;

FIG. 17 is a sectional view taken substantially along the line 17—17 in FIG. 16;

FIG. 18 is an enlarged side view of a longitudinal rail having a modified hinge construction according to the present invention; and FIG. 19 is a sectional view taken substantially along the line 19—19 in FIG. 18.

DETAILED DESCRIPTION OF THE PREFERRED EMBODIMENT

Figure 1:
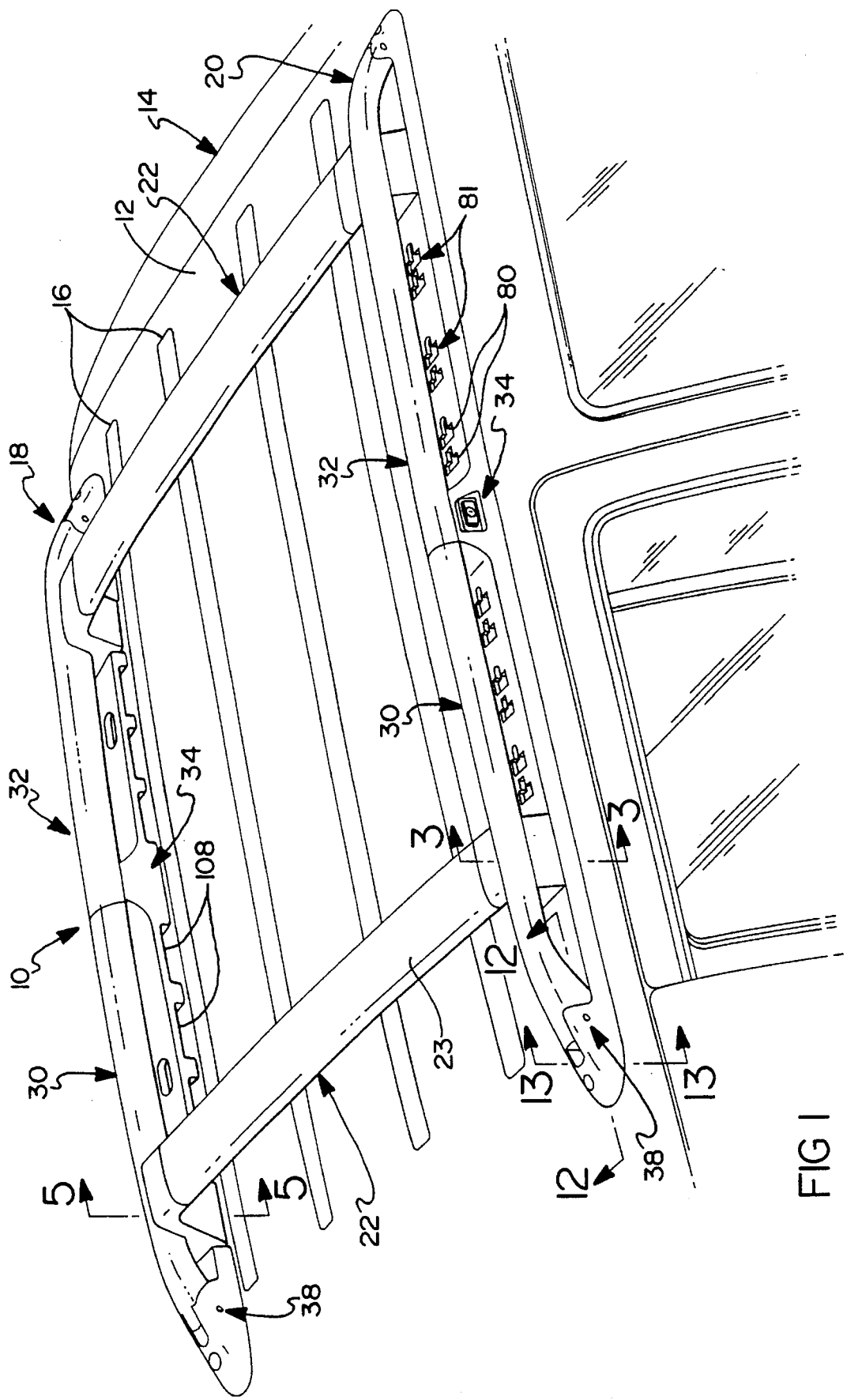
FIG. 1 is a perspective view of an article carrier mounted to a motor vehicle in accordance with the present invention.

Referring first to FIG. 1, an article carrier 10 according to the present invention is secured to roof panel 12 of a motor vehicle 14. The carrier rails 18 and 20 are secured by rivnuts and screws as is well known for mounting vehicle carriers to the panel 12, although other forms of attachment are also applicable without departing from the scope of the present invention. Additional details will be discussed below. Of course, the particular vehicle and the particular body panels to which the carrier 10 is mounted may also be varied without departing from the scope of the present invention. In any event, article carrier 10 is also combined with additional support strips 16 laid across and secured by screws or adhesives as is conventional for support strips to the roof panel 12 intermediate the rails 18 and 20 to prevent abrasion between any cargo carried on the carrier 10 and the finished surface of the vehicle panel 12.

The rails 18 and 20 are aligned in parallel, registering positions so as to engage the ends of at least one or more elongated crossbars 22. The rails 18 and 20 may be identical, but are identified by separate reference characters to demonstrate that they may differ stylistically as well as functionally as described below. Nevertheless they may also be of similar structure. For example, the rails 18 and 20 may be compatible or mirror image left hand and right hand stylings, but may function in the same manner.

Each longitudinal end 24 of each crossbar 22 is configured to correspond or mate with one of the rails 18 and 20, as will be described in greater detail hereinafter, to provide a fixed but adjustable position for the crossbar 22 between the rails 18 and 20. For example, a tubular member (FIG. 3) made of roll formed or extruded metal, or injection or blow molded plastic, may be carried between the ends of molded, step-shaped ends 24 and 26 of cast metal or molded plastic as shown in FIG. 1.

Figure 2:
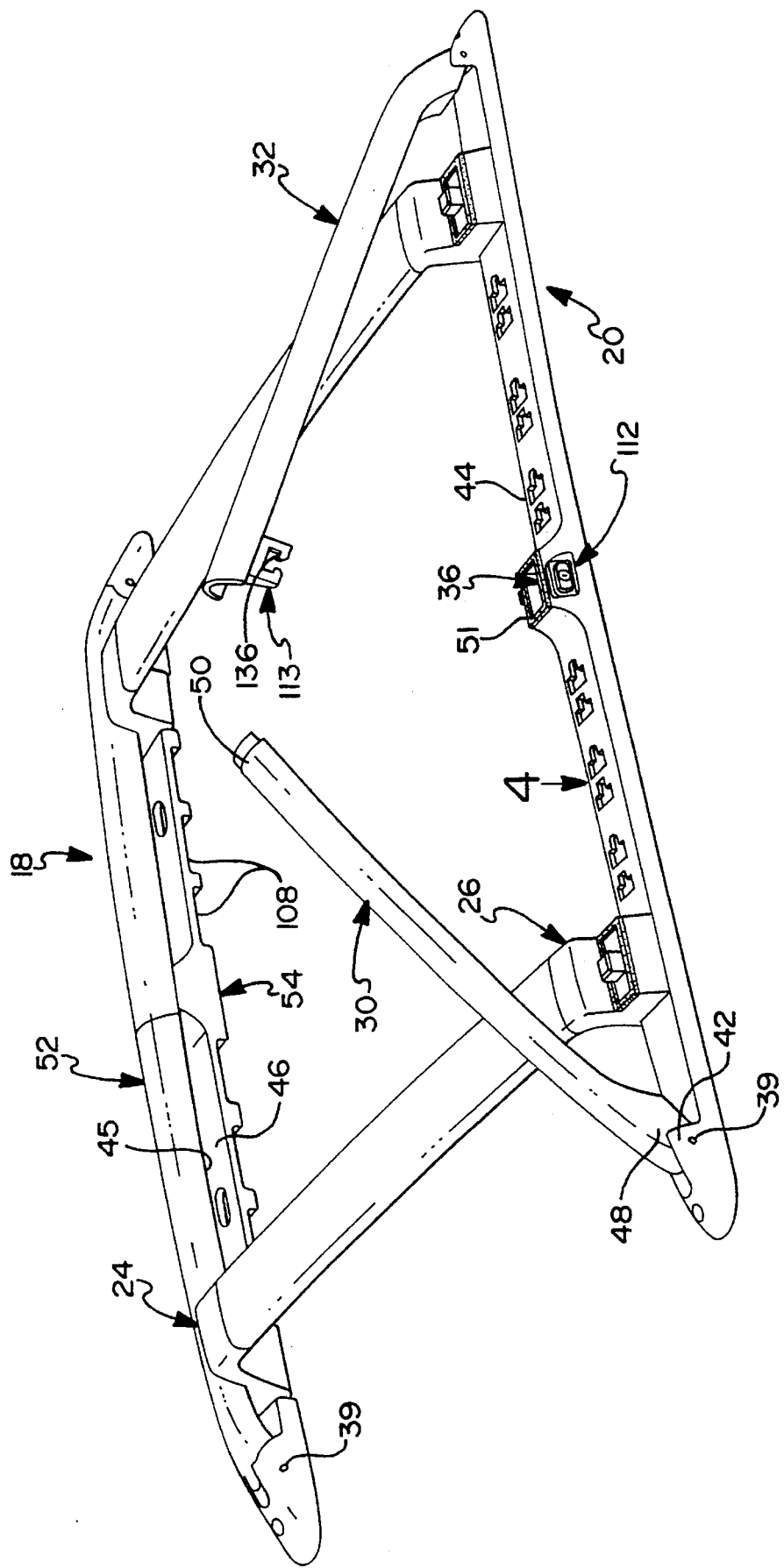
FIG. 2 is a perspective view similar to FIG. 1 but showing the upper arms of one rail in an open position, and a modified rail structure according to the present invention.

Each of the rails 18 and 20 shown in FIG. 1 include upper arms 30 and 32 carried on a lower arm 34. The lower arm 34 may be made in one piece or in several pieces. In any event, each upper arm 30 and 32 is pivotally secured to the lower arm 34. As shown in FIG. 2, the upper members 30 and 32 are hingedly secured at opposite longitudinal ends of the lower member 34 by hinges 38.

As best shown in FIG. 2, the hinge 38 in the embodiment of FIGS. 1 and 2 comprises a hinge pin 39 aligned on a transverse axis. The pin 39 extends through registering apertures in each of the upper arms 30 and 32, as well as through apertures in the hinge pin support 42 extending upwardly from the mating surface 44 of the lower arm 34. A latch 36 secures the upper arms 30 and 32 to the lower arm 34 in a spaced position to receive an extension on the ends 24 and 26 of the crossbars 22 between the upper arm 30 and lower arm 34. For example, the hinge end 48 of the arm 30 includes raised walls that elevate the intermediate portion of the arm 30 to a spaced position above the mating surface 44 of the lower arm 34. The latching end 50 of arm 30 closes against the latch stanchion 51 to support the arm 30 in raised position over most of the mating surface 44.

The rails 18 and 20 are preferably made of different constructions, for example, as shown in FIG. 2. The rail 18 in FIG. 2 includes upper and lower arms 52 and 54 which are secured together in spaced apart position to receive the extension 56 on crossbar end 24. Such a structure may be formed in one piece or formed by an assembly of multiple parts.

As best shown in FIG. 3, the lower member 34 of rail 20 may be a simple injection molded part having an outer styling wall 70 and inner support wall 72 and a recessed wall portion 74 defining a channel 76. A bottom wall of the recess includes a plurality of openings 78 adapted to receive the rivnut fastener in a well known manner. The mating surface 44 formed by portions of the walls 70 and 72 includes a plurality of longitudinally spaced openings 80, and preferably as shown in the preferred embodiment, pairs 81 of openings 80. Each opening 80 includes an enlarged area portion 82 and a narrow portion 84. A peripheral edge of the opening 80, particularly of the narrow portion 84, is defined by depending walls for strengthening the peripheral edges the opening 80 that form a retaining lip 86. Drain openings may be conveniently provided at the bottom of the channel 76 by drain holes 106 (FIGS. 3 and 4) and aligned at a low point of the recess formed in the lower rail arm 34.

The crossbar end 26 includes an extension 90 having a lower surface that mates with the mating surface 44 on the lower member 34 of the rail 20. The extension 90 includes a retainer in the form of a projection 94, preferably a pair of projections 94 as in the preferred embodiment, having an enlarged head 96 which is dimensioned to be received in the wide area portion 82 of the opening 80. A narrow stem portion of the projection is dimensioned to be received in the narrow portion 84 of the opening 80 so that the head 96 is in interference relationship beneath the lip 86. The enlarged head 96 is preferably injection molded with the stem of projection 94 on the bottom surface 92 of the extension 90 and formed in one piece with the extension. As shown in FIG. 14, the pair of projections 94 is offset from the center line 97 so that the portions assymetrically straddle the center line 97. This arrangement enables a portion 95 of the end 26 to cover the wide area portion 82 when the projection is received in the narrow portion 82.

Figure 5:
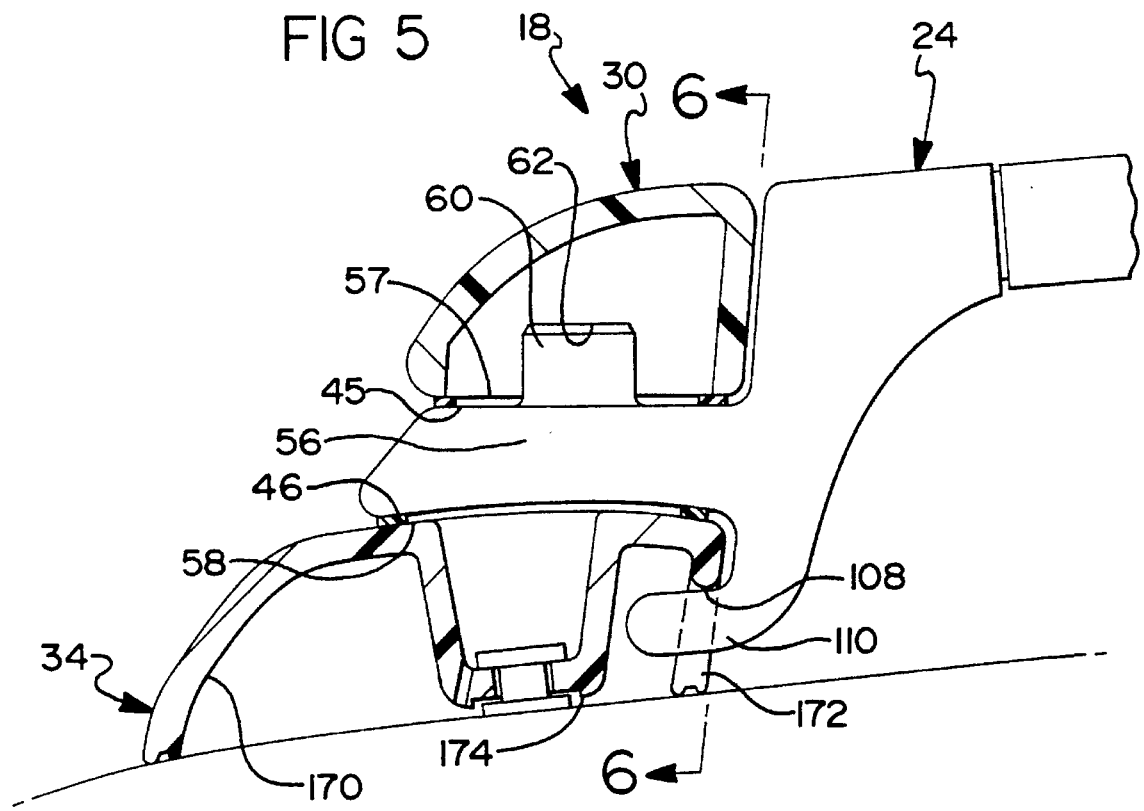
FIG. 5 is a sectional view taken substantially along line 5—5 in FIG. 1.
Figure 6:
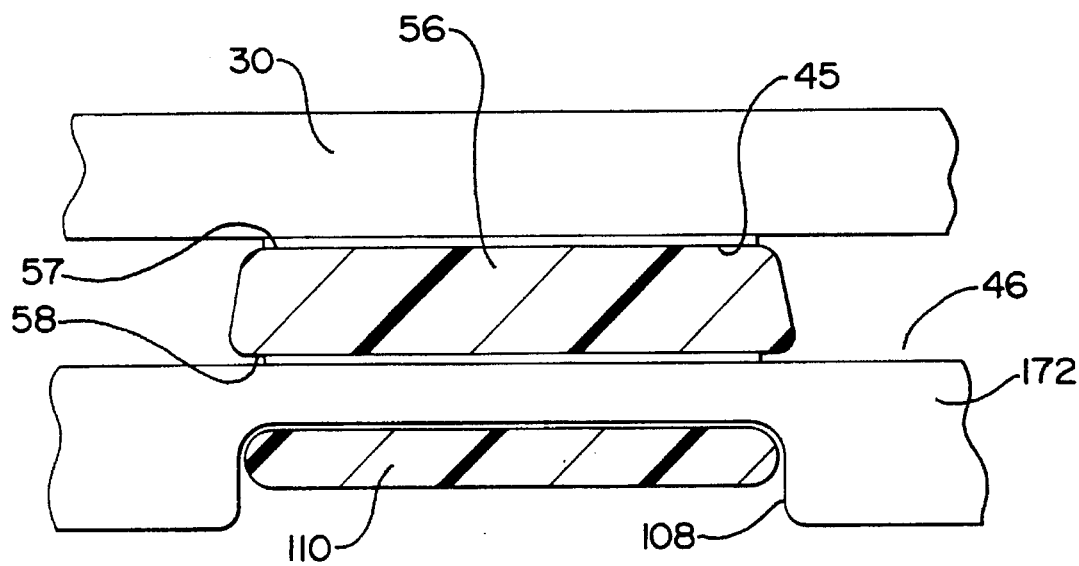
FIG. 6 is a sectional view taken substantially along line 6—6 in FIG. 5.

As shown in FIG. 5, the other end 24 of the crossbar 22 mates with the rail 18. The end 24 includes an extension 56. Each extension 56 of the crossbar end 24 includes mating surfaces 57 and 58 mating respectively with surfaces 45 and 46 on the rail 18. Like the lower member 34 of the rail 20, the lower rail member 34 of rail 18 includes an outer styling wall portion 170, a recessed wall portion 174 and an inner support wall 172. While the outer wall may be styled as a mirror image of the outer wall 70 of rail 20, interior wall 172 includes a plurality of longitudinally spaced and longitudinally expanded openings 108. The openings 108 receive an elongated lip 110 (FIG. 6) depending from the end 24 beneath the extension 56. The mating surfaces between the extensions on ends 24 and the rail 18 may also have complimentary configurations, for example, the block 60 on the upper surface of the crossbar end 24 adapted to be received in a plurality of sockets 62 spaced along the lower surface 45 of the upper arm 30.

Figure 7:
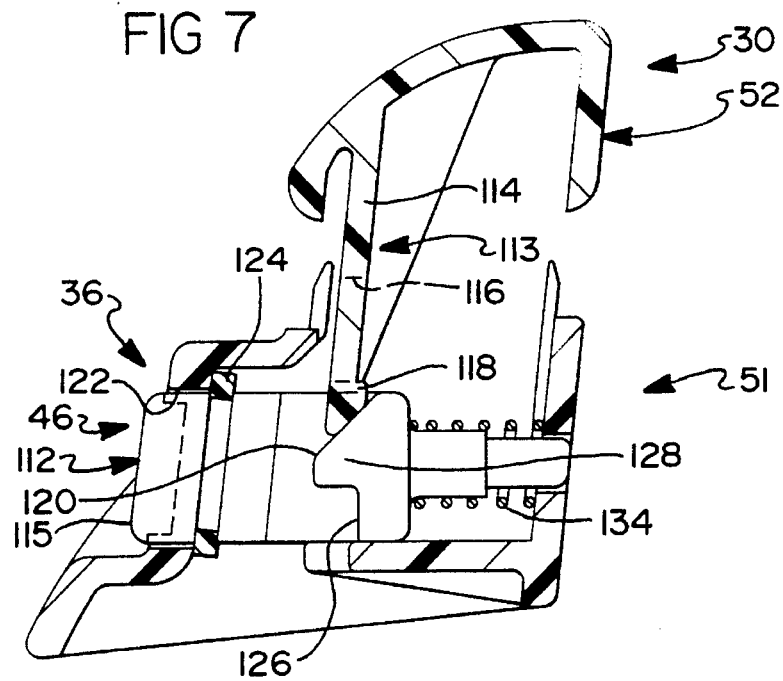
FIG. 7 is a sectional view of latch mechanism shown in FIGS. 1 and 2 with the upper rail arm in an open position.
Figure 8:
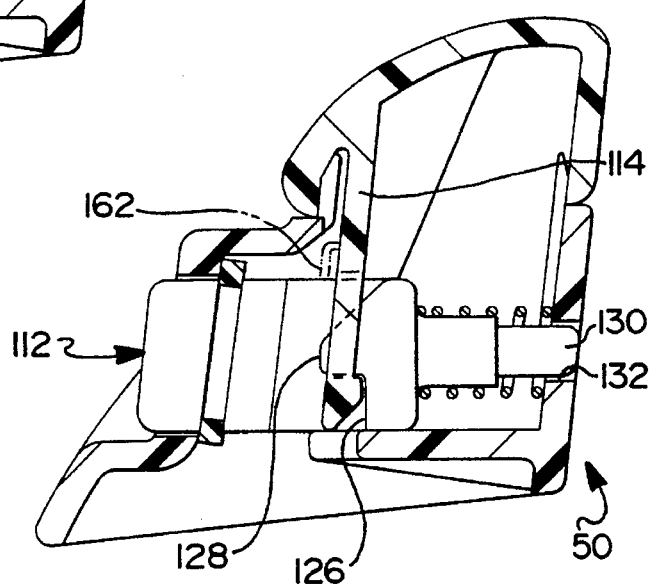
FIG. 8 is a sectional view similar to FIG. 7 but showing the upper rail arm in a closed position.
Figure 9:
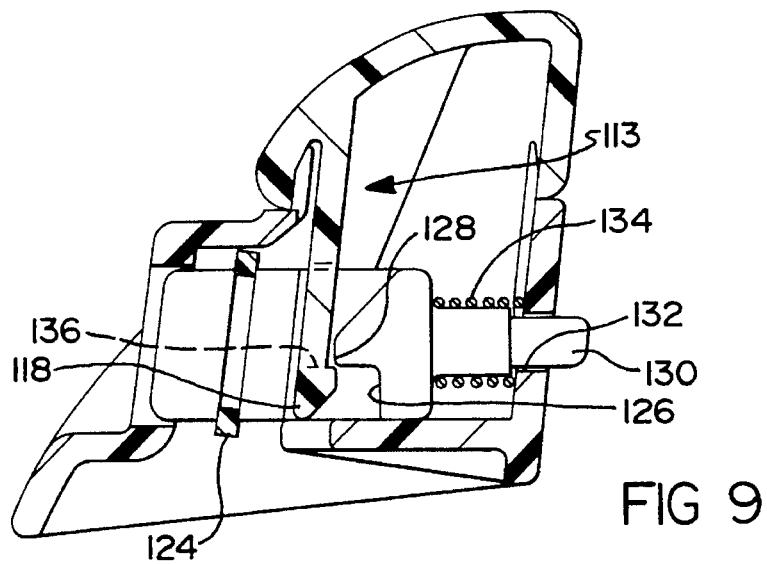
FIG. 9 is a sectional view similar to FIGS. 7 and 8 and showing the latch in an unlatched position with the upper rail arm closed.

As shown in FIG. 2, the latch end 50 of the upper arm 30 and the latch end 50 of the upper arm 32 include overlapping portions that may be closed against the latch 36. As best shown in FIGS. 7, 8 and 9, the latch 36 may be of conventional construction, and preferably comprises a push button 112 in a latch housing, preferably in the form of stanchion 51, adapted to receive a latch claw 113. The latch claw 113 comprises a leg 114 depending from the latch end 50 of the upper arm 32. In the preferred embodiment, a key actuated lock cylinder 155 (FIG. 16) is retrofit into a cavity of the push button 112 upon removal of the press-fit button cap 115. Preferably, a key access opening of the lock cylinder is exposed from an end of a button body 112 that faces outwardly from the vehicle. Nevertheless, the locking mechanism may also be separate from the latch 36 that holds the upper arms in the closed position.

Referring now to FIG. 7, the latch stanchion 51 is shown in relation to the latch end 52 of the arm 32. The latch 36 comprises a button body 112 spring biased outwardly from the cavity in the stanchion 51 by the spring 134. The button body 112 fits within an opening 122 in the stanchion 51, and is retained in position by a locking ring 124 installed over the button body by sliding the ring 124 through a slot in the stanchion after the button is inserted into the opening 122. The latching end 52 of the upper arm 30 includes the latching claw 113 formed by a depending leg 114 having an opening 116 above a flange foot 118. The flange foot 118 has a ramp surface mating with a ramp surface 120 on the button body 112. As shown in FIG. 7, the button 112 is in the latched or engaged position to resiliently engage the latch claw 113 as the upper arms 30 and 32 are moved to a closed position.

As the arm 30 is lowered to the position shown in FIG. 8, the flange foot 118 passes along the ramp surface 120 to a recessed portion 126 as a nose 128 at the end of the ramp surface 120 enters the opening 116. As shown in FIG. 8, the upper arms 30 and 32 are latched in position and the button nose 128 is engaged within the opening 116 in depending leg 114 and retained by the upper ledge 136 (FIGS. 2 and 9) of the foot 118. With the button body 112 in an engaged position shown in FIG. 8, a narrow end portion 130 of the button is retracted and entrained within an opening 132 in a wall forming the stanchion 51.

The button body 112 may be moved to the unlatched position as shown in FIG. 9 to release the upper arms 30 and 32 for moving the crossbars 22 to a proper position along the rails 18 and 20. With the button body 112 in the unlatched position as shown in FIG. 9, the narrow end portion 130 protrudes outwardly from the inner wall of the stanchion 51 to provide a visible indicator that the button is unlatched and that the upper arm 30 is not locked in its engaged position between the upper arm 30 and the lower arm 34 of the longitudinal rail. Although the latch housing may include a detent for maintaining the latch open in the position shown in FIG. 9, the spring 134 preferably biases the button body 112 toward the position shown in FIG. 8. Moreover, the arms 30 and 32 are preferably biased to a raised position as described below, whereby the arm ends 52 occupy a position above the stanchion 51, unless the button nose 128 engages the ledge 136 in leg 114.

As best shown in FIGS. 16 and 17, removal of the cap 115 from the button body 112 exposes a body cavity 150 that receives a locking cylinder 155. Such a cylinder receives a key 153, whose insertion releases a plurality of lock slides to a recessed position in a conventional manner, so that cylinder 155 can be circumferentially rotated within the cavity 150. An additional spring biased locking plate 156 is operable in response to an extended installation key, as shown in phantom line at 157, to lock the key cylinder 155 in a groove within the button body 112.

An eccentric, axially extended pin 158 is displaced within an arcuate recess 160 formed in the end wall of the button body 112. The pin 158 extends through an opening in a locking bar 162. The locking bar 162 slides in a slot in the button body as the pin is raised during rotation as shown in FIG. 16. The bar 162 is displaced from a recessed position shown in solid line in FIG. 16 to the extended locking position shown in phantom line in FIG. 16. In the locking position, the locking arm 162 prevents button actuation which would disengage the latch claw 113 from the nose 128 on the button body 112. Accordingly, the arms 30 and 32 remain secured in the closed positions, and the crossbars inserted between the longitudinal rails are locked in their fixed positions.

Referring now to FIG. 12, a preferred construction for one of the upper arms 30 or 32 of a longitudinal rail 18 or 20 includes a narrow hinge flange 168, preferably molded in one piece with the arm 30 or 32. As best shown in FIG. 13, flange 168 preferably includes a hollow chamber 164 for adjusting the strength and resiliency of the arm as it engages a backwall 166 formed on the lower member 34 of the rail 20. As best shown in FIG. 13, a peaked surface 163 on an extended lip 165 of the hinge flange 168 mates with the tapering detent 167 on the bottom of the rear wall 166. Mating engagement of the peak 163 and the detent 167 tends to the center the arm 30 or 32 over the lower member of the rail 20, and tends to center the latching claw 113 over the latch stanchion 51.

Resiliency in the wall 166 and the hollow flange 164 can be employed to maintain the arm 30 or 32 in a raised position. As the arm 30 or 32 is pivoted about the hinge pin 39 in the direction opposite to the arrow 176 in FIG. 12, the lip 165 mates with the lower edge of the wall 166 at a position before the latching end 50 reaches the latching stanchion 51 on the lower member 34 of rail 20. As a result, additional force must be exerted upon the arm to latch the latching claw into the latching stanchion 51, and resilient biasing forces are imposed by the wall 163 and the hinge flange 168 due to the resilience of the material from which they are made.

An additional feature for reducing the mass and weight of the article carrier is to form the arms 30 and 32 as hollow channels but with strengthening ribs or bulkheads. In the preferred embodiment, bulkheads such as the full walls 178 and 180 and the recessed rib wall formed between the walls 178 and 180, form a socket adapted to receive the blocks 60 or 98 on a crossbar 22.

Referring now to FIGS. 18 and 19, an alternative hinge connection is thereshown in which the upper arm 30 or 32 carries one half of a ball and socket joint 183, while the lower rail member 34 includes the other half of the ball and socket joint. As shown in FIG. 19, a socket recess 184 is received in an opening 186 in a side wall of the upper arm 30 or 32. The socket 184 receives a ball head 188 at the end of a threaded stem 190 that is received in a threaded boss 200 on a wall of the lower member 34 of the rail 20. Such a hinge connection allows both pivoting movement and breakaway protection. The upper arm 30 or 32 can sustain lateral or twisting movement without breaking the rail parts or the hinge connection when the rails are subjected to torsional load or other twisting or turning while the upper arms 30 and 32 are open.

In addition, the upper arm 30 or 32 includes a guide 202 that fits against a correspondingly arched wall portion 206 that guides the arm 30 or 32 throughout its pivoting movement about the hinge axis. The wall portion 206 includes a rib 212 to resist lateral movement when the arm is in the latched position, until the arm 30 or 32 pivots to a raised position at which the guide 202 passes the rib 212. In addition, protrusions 204 on the wall of the lower member 34 adjacent to the side wall of the hinge flange 168 mate with detents 206, 208 and 210 (FIGS. 4 and 12) at positions of arcuate movement of the upper arms. As a result, the arms 30 and 32 may be supported at a range of angles for example 30°, or greater than 90°, during positioning or loading of the crossbars 22. Nevertheless, the hinge parts of the ball and socket joint 183 are easily separated if one of the upper arms 30 or 32 is subjected to severe transverse or twisting motions when maintained in an upright or open position to avoid breakage of the arm or rail parts.

Figure 10:
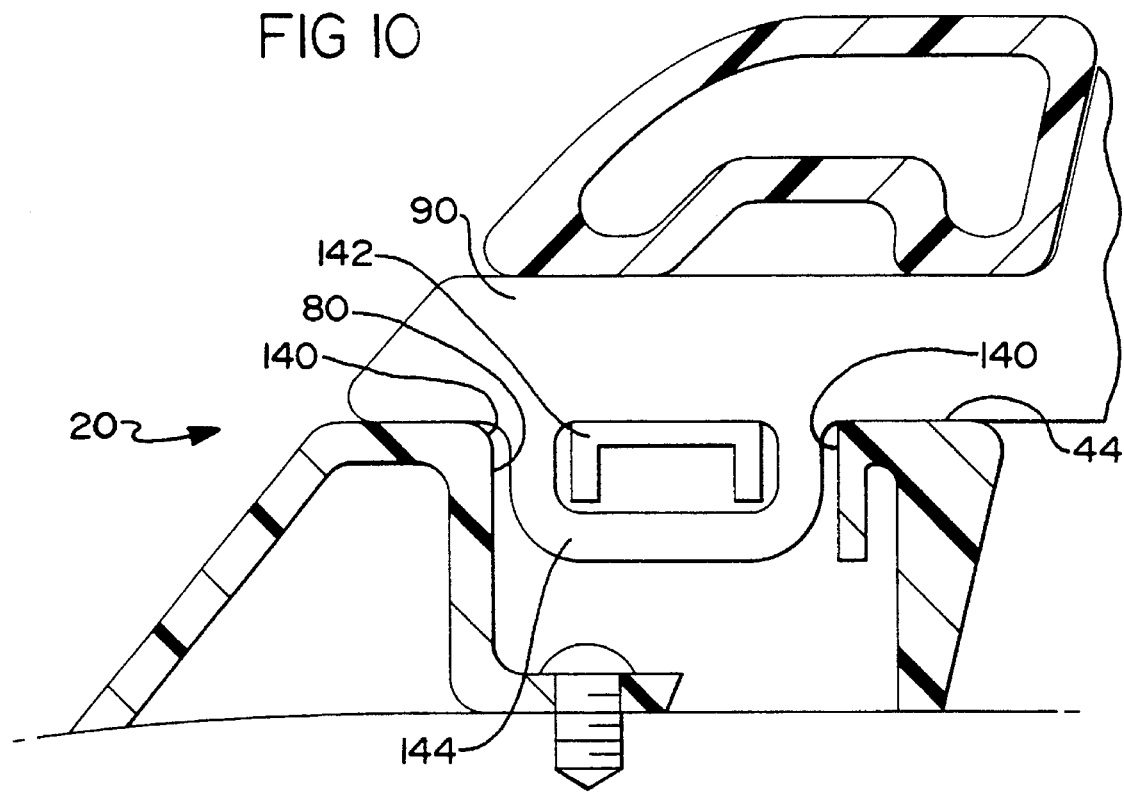
FIG. 10 is a sectional view similar to FIG. 3 but showing a modification of the crossbar according to the present invention.
Figure 11:
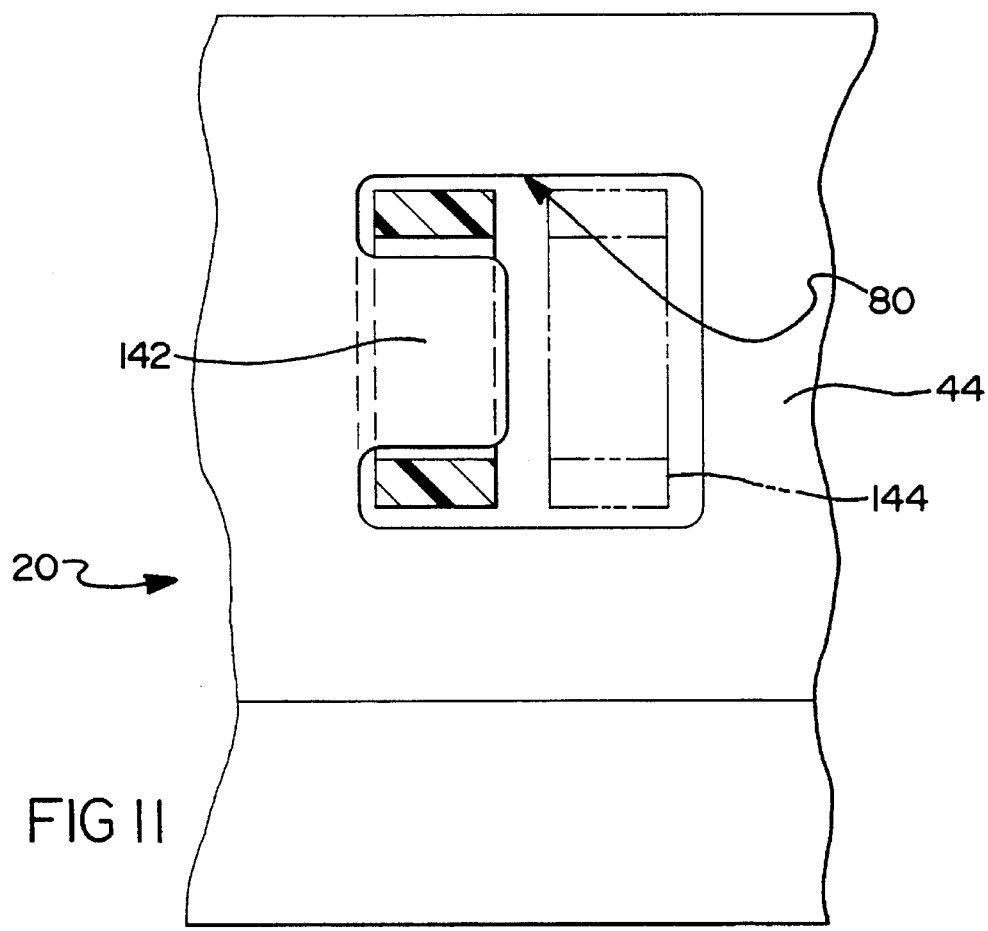
FIG. 11 is a plan view of the carrier structure shown in FIG. 10 but with portions removed for the sake of clarity.

Referring now to FIG. 10, a modification of the rail 20 is thereshown mating with a modified version of the end 24 of crossbar 22. In particular, the opening 80 comprises a pair of spaced narrow openings 140 through the mating surface 44 separated by a finger 142 (FIG. 11) forming a lateral lip. In addition, the mating surface 92 of the extension 90 includes a retainer in the form of a loop 144 with a central opening adapted to receive the finger 142. The loop 144 may be inserted in a wide portion 146 of the opening 180, as shown in phantom line in FIG. 11 before displacement over the finger 142 to the locking position shown in solid line in FIG. 11.

Having thus described the preferred embodiment of the present invention, many modifications thereto will become apparent to those skilled in the art to which it pertains without departing from the scope and spirit of the present invention as defined in the appended claims.

We claim:

1. A luggage carrier comprising:
    a pair of transversely spaced, parallel rails, each rail having an upper arm, a lower arm registering with said upper arm and a support positioning said upper arm at a spaced position above said lower arm;
    at least one crossbar extending transversely across said rails, each said crossbar having first and second ends, each end dimensioned to be received between said upper and lower arms of said rails and including a retainer;
    wherein at least one rail includes a hinge coupling said upper arm to said lower arm for pivotal movement to and from said spaced position to an open position; and
    wherein said lower arm includes a lip vertically overlapping said retainer to retain said crossbar against vertical separation from its position on the lower rail when said crossbar end is received on portions of said lower rail.

2. The invention as defined in claim 1 wherein said retainer comprises a loop dimensioned to receive said lip.

3. The invention as defined in claim 1 wherein said retainer comprises a projection with an enlarged head.

4. The invention as defined in claim 1 wherein said at least one rail has an upper wall that includes a plurality of openings, and wherein said lip comprises a wall portion forming a projection extending into said opening.

5. The invention as defined in claim 1 wherein said at least one rail includes a second upper arm and a second hinge coupling said second upper arm to said lower arm for pivotal movement to and from said spaced position to an open position.

6. The invention as defined in claim 5 wherein each upper arm has a second end opposite said hinge and said second ends overlap in said spaced position.

7. The invention as defined in claim 1 wherein said at least one end includes one of a protrusion and a complementary groove and each said rail includes the other of said protrusion and said complementary groove.

8. The invention as defined in claim 7 wherein each said rail includes a plurality of said other of said protrusion and complementary groove.

9. The invention as defined in claim 8 wherein said protrusion is transversely aligned with respect to the rail length.

10. The invention as defined in claim 8 wherein said protrusion is vertically aligned with respect to the parallel rails.

11. The invention as defined in claim 7 wherein said protrusion is transversely aligned with respect to the rail length.

12. The invention as defined in claim 7 wherein said protrusion is vertically aligned with respect to the parallel rails.

13. The invention as defined in claim 1 wherein said hinge has a longitudinal hinge axis with respect to the rail length.

14. The invention as defined in claim 1 wherein said hinge has a transverse hinge axis.

15. A luggage carrier of the type that receives a crossbar having a configured surface on at least one end, the carrier comprising:

a pair of transversely spaced, parallel rails, each rail having an upper arm, a lower arm registering with said upper arm and a support positioning said upper arm at a spaced position above said lower arm;

a crossbar having opposite first and second ends;

wherein one of said first and second ends includes one of a protrusion and a complementary groove and each said side rail includes the other of said protrusion and said complementary groove, and one of said first and second ends includes a retainer for vertical overlap with said rail;

wherein at least one rail includes a hinge coupling said upper arm to said lower arm for pivotal movement to and from said spaced position to an open position; and wherein said at least one rail includes a latch for releasably latching said upper arm in said spaced position; and wherein said lower arm includes a lip vertically overlapping said retainer to retain said crossbar against vertical separation from its position on the lower rail when said crossbar end is received on portions of said lower rail.

16. The invention as defined in claim 15 wherein said lip comprises a wall rib.

* * * * *